UNITED STATES PATENT OFFICE.

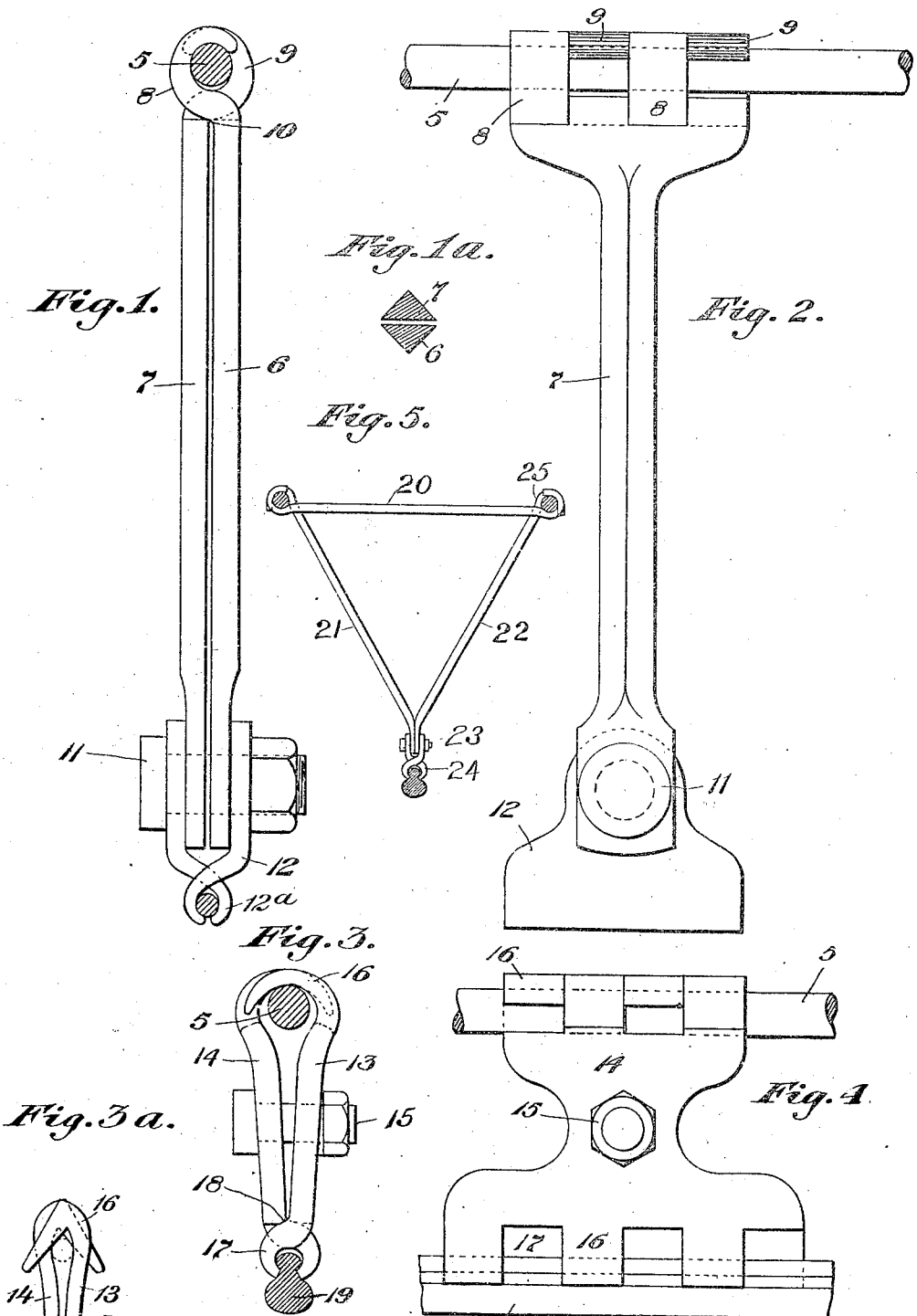

GEORGE B. DUSINBERRE, OF CLEVELAND, OHIO, ASSIGNOR TO WESTINGHOUSE ELECTRIC & MANUFACTURING COMPANY, A CORPORATION OF PENNSYLVANIA.

TROLLEY-HANGER.

No. 931,398.  Specification of Letters Patent.  Patented Aug. 17, 1909.

Application filed December 9, 1907. Serial No. 405,691.

*To all whom it may concern:*

Be it known that I, GEORGE B. DUSINBERRE, a citizen of the United States, residing at Cleveland, in the State of Ohio, have invented certain new and useful Improvements in Trolley-Hangers, of which the following is a specification.

My invention relates to hangers for suspending trolley wires from messenger wires or cables, and its primary object is to simplify the construction and provide a single clamping means for fastening the hanger to the messenger wire or cable and to the trolley wire.

In the accompanying drawing, Figures 1 and 2 are side elevations, at right angles to each other, of a preferred form of clamp and hanger, in which the parts which engage the messenger wire or cable are interlaced teeth. Fig. 1$^a$ is a cross section of the hanger rods shown in Figs. 1 and 2. Figs. 3 and 4 are side elevations corresponding to Figs. 1 and 2 but illustrating a modified form in which the same members engage both the messenger wire and the trolley wire, Fig. 3$^a$ is a detail view of a modification of the upper ends of the hanger rods, and Fig. 5 shows a form of hanger which is adapted for double catenary construction.

In order to secure safety and convenience in handling, it is desirable that a single fastening means should attach the hanger parts together, and that there should be no danger of accidental displacement of the said parts.

In Figs. 1 and 2, the single messenger wire 5 is shown gripped by curved jaw teeth 8 and 9 which are formed on the top of a hanger composed of the two rods 6 and 7. The jaw teeth 8 and 9 are preferably made exactly alike in the two members and are interlaced to grip the wire 5, the said members being fulcrumed directly upon each other at the bases of the teeth, as indicated at 10. Thus, when the two rods 6 and 7 are brought together, the wire 5 is gripped with a very strong leverage and a very secure hold is attained. Obviously, it is impossible to detach the hanger from the wire 5 without raising the rods 6 and 7 to a horizontal position, which could not occur accidentally, even if no fastening device were employed.

To further secure the grip on the messenger wire, the suspension rods 6 and 7 are preferably held together by some means, such as a bolt 11, and the same bolt also is preferably utilized to secure together the jaw members 12 and 12$^a$ of a trolley wire clamp. The arms 6 and 7 preferably have some resiliency, and may also conveniently be formed of the cross-section shown in Fig. 1$^a$ in order to reduce lateral wind stress as much as possible.

In the short form of hanger shown in Figs. 3 and 4, the rods 13 and 14 are provided, at their respective ends, with integral gripping devices for the messenger wire and the trolley wire. The teeth of the gripping jaws 16 are preferably interlaced, but the opposing teeth are not crossed and they may be so disposed as to allow of lateral play of the hanger. The lower ends of the arms 13 and 14 are provided with crossed interlacing teeth 17 to engage the trolley wire 19 and are fulcrumed upon each other, as indicated at 18. By this construction, I get an extremely secure and strong hold upon the trolley wire by utilizing the ends of the hanger rods as means for attaching the hanger to the messenger wire and as a trolley wire clamp. Obviously, the play of the rods 13 and 14 is sufficient to permit the trolley wire clamp to operate and still sufficiently insure an efficient hold upon the messenger wire at all times, any suitable means, such as a bolt 15, being employed for holding the rods together.

In Fig. 5 is shown a modification for use in the double catenary construction, wherein all three of the arms 20, 21 and 22 are held together by one fastening device 23, which may also hold the trolley clamp 24, the jaws 25 at the messenger wire being as indicated in Fig. 1.

It will be observed that in each of the described structures the gripping jaws for the trolley wire and the messenger wire mutually support each other against any possibility of removal. In the form shown in Fig. 3, the jaws may be modified in form so that the mere weight of the trolley and hanger will prevent the possibility of the device coming off the messenger wire, as is illustrated, for example, in Fig. 3$^a$.

Other uses and advantages of the device will readily occur to those familiar with the art.

I claim as my invention:

1. A trolley wire hanger comprising a clamp for the trolley wire and a gripping device for the supporting wire, and a single fastening means for said clamp and said gripping device.

2. A trolley wire hanger comprising a gripping device for the trolley wire and a gripping device for the supporting wire, the members of one of said gripping devices being fulcrumed each upon the other, and a single fastening means for both gripping devices.

3. A trolley wire hanger comprising a pair of gripping devices having interlaced teeth for attachment to a supporting wire and to a trolley wire, and a single fastening means for both of said gripping devices.

4. A trolley wire hanger comprising two rods having interlaced teeth which are adapted to engage a trolley wire and a supporting wire.

5. A trolley wire hanger comprising two rods having end portions provided with interlaced gripping teeth, the adjacent end portions being pivotally supported upon each other at the bases of their interlaced teeth.

6. A trolley wire hanger comprising two members having end portions provided with interlaced gripping teeth, the adjacent end members being pivoted upon each other at the base of the teeth, and a single fastening means for both members.

In witness whereof I have hereunto signed my name in the presence of the two subscribed witnesses.

GEORGE B. DUSINBERRE.

Witnesses:
C. L. BURRIDGE,
F. W. FRECH.